(12) United States Patent
Kokel et al.

(10) Patent No.: US 8,722,790 B2
(45) Date of Patent: May 13, 2014

(54) HEAT-SEALABLE POLYOLEFIN FILMS

(75) Inventors: Nicolas Kokel, Rhode Sant Genèsé (BE); Stéphanie Lahaye, Hondelange (BE)

(73) Assignee: Basell Pololefine Italia, S.r.l., Milan (IT)

( * ) Notice: Subject to any disclaimer, the term of this patent is extended or adjusted under 35 U.S.C. 154(b) by 0 days.

(21) Appl. No.: 11/793,660

(22) PCT Filed: Nov. 8, 2005

(86) PCT No.: PCT/EP2005/055820
§ 371 (c)(1),
(2), (4) Date: Jun. 20, 2007

(87) PCT Pub. No.: WO2006/066998
PCT Pub. Date: Apr. 29, 2006

(65) Prior Publication Data
US 2008/0114113 A1    May 15, 2008

Related U.S. Application Data

(60) Provisional application No. 60/656,365, filed on Feb. 25, 2005.

(30) Foreign Application Priority Data

Dec. 21, 2004    (EP) .................................... 04030255

(51) Int. Cl.
*C08K 3/26*    (2006.01)
*C08K 5/00*    (2006.01)
*C08L 23/00*   (2006.01)

(52) U.S. Cl.
USPC ........... 524/515; 524/425; 524/445; 525/240; 525/242

(58) Field of Classification Search
USPC .......... 524/425, 445, 446, 427, 515; 502/230; 525/240, 242
See application file for complete search history.

(56) References Cited

U.S. PATENT DOCUMENTS

| | | | |
|---|---|---|---|
| 3,250,639 A * | 5/1966 | Stead | 428/349 |
| 4,189,420 A * | 2/1980 | Sugimoto et al. | 524/308 |
| 4,856,656 A * | 8/1989 | Sugimoto et al. | 206/523 |
| 5,948,547 A * | 9/1999 | Mikielski et al. | 428/516 |
| 6,033,514 A * | 3/2000 | Davis et al. | 156/244.11 |
| 6,395,831 B1 * | 5/2002 | Pelliconi et al. | 525/191 |
| 6,638,637 B2 * | 10/2003 | Hager et al. | 428/516 |
| 6,822,049 B2 * | 11/2004 | Ebara et al. | 525/191 |
| 7,125,924 B2 | 10/2006 | Credali et al. | |
| 7,399,509 B2 * | 7/2008 | Virtanen | 428/40.1 |
| 2004/0198919 A1 * | 10/2004 | Pelliconi et al. | 525/333.7 |
| 2005/0107538 A1 | 5/2005 | Pelliconi et al. | |

FOREIGN PATENT DOCUMENTS

| | | |
|---|---|---|
| EP | 361493 | 4/1990 |
| EP | 400333 | 12/1990 |
| EP | 472946 | 3/1992 |
| EP | 477662 | 4/1992 |
| EP | 556815 | 8/1993 |
| EP | 560326 | 9/1993 |
| EP | 674991 | 10/1995 |
| EP | 728769 | 8/1996 |
| WO | 00/11076 | 3/2000 |
| WO | 03/911962 | 2/2003 |
| WO | 03/031514 | 4/2003 |
| WO | 2004/026957 | 4/2004 |

OTHER PUBLICATIONS

"Film." Online Dictionary.*

* cited by examiner

*Primary Examiner* — Hannah Pak

(57) ABSTRACT

Heat-sealable polyolefin film made of or comprising at least one layer of a polyolefin composition comprising (percent by weight):

A) 20% to 80% of a heterophasic polyolefin composition comprising:

$A^I$) 3% to 30% by weight of a crystalline olefin polymer fraction;

$A^{II}$) 70% to 97% by weight of an elastomeric fraction comprising at least an elastomeric copolymer of propylene or ethylene with 12 to 88% by weight of at least one α-olefin of formula $H_2C{=}CHR$, where R is H or a C2-C10 linear or branched alkyl, optionally containing 0.5 to 5% by weight of a diene, and having solubility in xylene at room temperature greater than 50% by weight;

B) 20% to 80% of at least one filler.

7 Claims, No Drawings

HEAT-SEALABLE POLYOLEFIN FILMS

This application is the U.S. national phase of International Application PCT/EP2005/055820, filed Nov. 8, 2005, claiming priority to European Patent Application 04030255.6 filed Dec. 21, 2004, and the benefit under 35 U.S.C. 119(e) of U.S. Provisional Application No. 60/656,365, filed Feb. 25, 2005; the disclosures of International Application PCT/EP2005/055820, European Patent Application 04030255.6 and U.S. Provisional Application No. 60/656,365, each as filed, are incorporated herein by reference.

The present invention relates to heat-sealable polyolefin films.

Such kind of polyolefin films is widely used in the packaging field, especially in the food packaging field, but also for the packaging non food products and for the production of non-packaging items.

Packaging examples are the primary packaging of hygienic items, textile articles, magazines, mailing films, secondary collation packaging, shrink packaging films and sleeves, stretch packaging films and sleeves, form-fill-seal packaging films for portionating various types of articles such as bags, pouches or sachets, vacuum formed blisters.

Examples of form-fill-seal applications are the packaging of peat and turf, chemicals, plastic resins, mineral products, food products, small size solid articles.

The above applications and, in general, all the applications involving use of plastic films for packaging are included in the general definition of "flexible plastic packaging".

Non packaging items are for example synthetic clothing articles or medical and surgical films, films which are formed into flexible conveying pipes, membranes for isolation and protection in soil, building and construction applications, films which are laminated with non-woven membranes.

The film is characterized by the presence of at least one polyolefin layer that can be easily sealed to itself or to other materials by applying heat and pressure (heat-sealable layer).

The features of the seal, in particular the seal strength, are determined by the choice and the relative amounts of the olefin polymers composing the sealing layer.

In particular, in EP0556815, EP0560326, EP0674991, WO00/11076 and WO03/031514 various technical solutions are described, based on use of random copolymers of propylene.

On the other hand, polymer products made up of heterophasic mixtures of propylene crystalline polymers and elastomeric olefin copolymers, typically obtained by sequential stereospecific polymerization, are establishing themselves in the polypropylene industry. These products possess a satisfying compromise of elastic properties and mechanical resistance and can easily be transformed into manufactured articles by using the equipments and processes normally used for thermoplastic materials. As disclosed in particular in EP0477662, such polymer products can be used to produce films with improved elongation at break and Elmendorf tear properties and good optical properties. However, the heat sealing properties of these products are not satisfactory, because in the typical range of sealing temperatures used in the industrial practice, namely from about 95° C. to about 110° C., the seal strength is not particularly high, and also because the heterophasic compositions result to be too sticky for use in packaging films to be heat sealed.

It has now been surprisingly found that by adding relatively high amounts of fillers to specific kinds of heterophasic compositions, the said stickiness problems do not occur, and the seal strength so achieved is high enough for industrial use.

Therefore, an object of the present invention is a heat-sealable polyolefin film made of or comprising at least one layer of a polyolefin composition (I) comprising (percent by weight):

A) 20% to 80%, preferably 20% to 70%, more preferably 30% to 60%, of a heterophasic polyolefin composition comprising:

$A^I$) 3% to 30%, preferably 5% to 25% by weight of a crystalline polymer fraction selected from: (i) a propylene homopolymer, having solubility in xylene at room temperature lower than 10% by weight; (ii) a copolymer of propylene and at least one α-olefin of formula $H_2C=CHR$, where R is H or a C2-C10 linear or branched alkyl, containing at least 85% by weight of propylene, having solubility in xylene at room temperature lower than 15% by weight; (iii) a mixture of (i) and (ii);

$A^{II}$) 70% to 97%, preferably 75% to 95% by weight of an elastomeric fraction comprising at least an elastomeric copolymer of propylene or ethylene with 12 to 88%, preferably 15 to 75% by weight of at least one (different)α-olefin of formula $H_2C=CHR$, where R is H or a C2-C10 linear or branched alkyl, optionally containing 0.5 to 5% by weight of a diene, and having solubility in xylene at room temperature greater than 50% by weight;

B) 20% to 80%, preferably 30% to 80%, more preferably 40% to 70%, of at least one filler.

By "room temperature" it is meant herein a temperature of about 23° C.

By "elastomeric" it is meant herein a polymer having low crystallinity or amorphous, having a solubility in xylene at room temperature greater than 50% by weight.

Preferably, the intrinsic viscosity of the xylene soluble fraction of ($A^{II}$) is from 2.0 to 6.5 dl/g, more preferably from 3 to 6.5 dl/g.

The Melt Flow Rate (230° C./2.16 kg) value for the said heterophasic composition (A) preferably ranges from 0.1 to 15 g/10 min., while it is preferably of from 0.1 to 10 g/10 min. for the polyolefin composition (I) comprising the components (A) and (B).

The copolymer of propylene (ii) contains preferably at least 90% by weight propylene, and has solubility in xylene at room temperature preferably lower than 10% by weight, and even more preferably lower than 8%. Said alpha-olefin is preferably ethylene, butene-1, pentene-1, 4-methylpentene, hexene-1, octene-1 or combinations thereof, and even more preferably the copolymer of propylene (ii) is a copolymer of propylene and ethylene.

The elastomeric fraction ($A^{II}$) of the heterophasic composition (A) preferably contains from 20 to 40% by weight alpha-olefin, specific examples of which are given above in connection with the (ii) copolymer, and has solubility in xylene at room temperature greater than 80% by weight, the intrinsic viscosity of the xylene soluble fraction preferably ranging from 4.0 to 5.5 dl/g.

According to a preferred embodiment of the present invention, the elastomeric fraction ($A^{II}$) comprises a first elastomeric copolymer (1) and a second elastomeric copolymer (2).

More preferably, said elastomeric fraction comprises:

(1) a first elastomeric copolymer of propylene with at least one alpha-olefin of formula $H_2C=CHR$, where R is H or a C2-C10 linear or branched alkyl, optionally containing 0.5 to 5% by weight of a diene, said first elastomeric copolymer containing from 15 to 32% by weight alpha-olefin, preferably from 20 to 30, and having solubility in xylene at room temperature greater than 50% by weight, the intrinsic viscosity of the xylene soluble fraction ranging from 3.0 to 5.0 dl/g; and (2) a second elastomeric copolymer of propylene with at least one alpha-olefin of formula $H_2C=CHR$, where R is H or a C2-C10 linear or branched alkyl, optionally containing 0.5 to 5% by weight of a diene, said second elastomeric copolymer containing more than 32% up to 45% by weight alpha-olefin, preferably from 35 to 40%, and having solubility in xylene at room temperature greater than 80% by weight, the intrinsic viscosity of the xylene soluble fraction ranging from 4.0 to 6.5 dl/g; the (1)/(2) weight ratio ranging from 1:5 to 5:1, preferably from 1:2 to 4:1, and more preferably from 1:1 to 2:1.

The first elastomeric copolymer (1) is preferably a copolymer of propylene with at least one alpha-olefin selected from ethylene, butene-1, hexene-1 and octene-1; even more preferably said alpha-olefin is ethylene. The first elastomeric copolymer (1) has a solubility in xylene at room temperature greater than 50% by weight, preferably greater than 70%, and even more preferably greater than 80%; the intrinsic viscosity of the xylene soluble fraction ranges from 3.0 to 5.0 dl/g, more preferably from 3.5 to 4.5 dl/g, and even more preferably from 3.8 to 4.3 dl/g.

The second elastomeric copolymer (2) is preferably a copolymer of propylene with at least one alpha-olefin selected from ethylene, butene-1, hexene-1and octene-1; even more preferably, said alpha-olefin is ethylene. The second elastomeric copolymer (2) has solubility in xylene at room temperature greater than 80% by weight, preferably greater than 85%, and the intrinsic viscosity of the xylene soluble fraction ranges from 4.0 to 6.5 dl/g, preferably from 4.5 to 6.0, and more preferably from 5.0 to 5.7 dl/g.

The copolymerization of propylene and ethylene or another alpha-olefin or combinations thereof, to form the elastomeric fraction ($A^{II}$) can occur in the presence of a diene, conjugated or not, such as butadiene, 1,4-hexadiene, 1,5-hexadiene and ethylidene-norbornene-1. The diene, when present, is contained in an amount of from 0.5 to 5% by weight, with respect to the weight of the fraction ($A^{II}$).

The heterophasic polyolefin composition (A) can present crystallinity deriving from poly-alpha-olefin sequences, and preferably from polyethylene sequences, due to the partial formation of such sequences in the polymerization of the elastomeric copolymer(s) ($A^{II}$). This crystallinity may be detected by measuring the heat of fusion deriving from poly-alpha-olefin sequences (e. g. PE enthalpy) by means of Differential Scanning Calorimetry (DSC) analysis; in DSC, the composition may present at least a melting peak attributable to a crystalline PE phase, i. e. to $(CH_2)$ n sequences of the crystalline type. Preferably the heat of fusion of peaks present below 130° C. and attributable to polyethylene sequences is greater than 3 J/g.

The heterophasic polymer composition (A) used in the films of the present invention is preferably prepared through sequential polymerization in two or more stages, using highly stereospecific Ziegler-Natta catalysts. Component ($A^I$) preferably forms during the first stage of polymerization, while component ($A^{II}$) forms during the subsequent polymerization stages in the presence of component ($A^I$). In particular it is possible to use catalysts comprising the product of the reaction of a solid component containing a titanium compound having at least an halogen atom bonded to the Ti and an electron-donor compound (inside donor) supported on magnesium chloride, with an Al-trialkyl compound and an electron-donor (outside donor). The preferred titanium compound used is $TiCl_4$. The inside donor is preferably selected from ethers, ketones, lactones, compounds containing N, P and/or S atoms, and esters of mono- and dicarboxylic acids.

Particularly suitable electron-donor compounds are phthalic acid esters, such as diisobutyl, dioctyl, diphenyl and benzylbutyl phthalate.

Other electron-donors particularly suitable are 1,3-diethers, as disclosed in published European patent applications 361493 and 728769.

The outside donor is preferably selected from silicon compounds containing one of more —OR groups, where R is a hydrocarbon radical. The previously said 1,3-diethers can also be used advantageously. If the internal donor is one of these dieters, the external donors can be omitted. Specific examples are diphenyldimethoxysilane, dicyclohexyl dimethoxysilane, methyltert-butyl dimethoxysilane, diisopropyl dimethoxysilane and phenyltriethoxysilane.

The polymerization stages may occur in liquid phase, in gas phase or liquid-gas phase.

Preferably, the polymerization of the polymer fraction ($A^I$) is carried out in liquid monomer (e. g. using liquid propylene as diluent), while the copolymerization stage or stages used to prepare the elastomeric copolymer(s) ($A^{II}$) are carried out in gas phase, without intermediate stages except for the partial degassing of the propylene. According to a most preferred embodiment, all the sequential polymerization stages are carried out in gas phase.

Examples of catalysts and polymerization processes suitable for preparing the above mentioned heterophasic polypropylene compositions are described in EP0400333, EP472946 and WO03/011962.

The filler (B) which is added in the said amounts to the heterophasic composition (A), can be in principle selected among all kinds of fillers known in the art.

Preferred are the inorganic and in particular the mineral fillers, like talc, kaolin, clay, anhydrous or hydrated oxides and salts of metals (as, in particular, Al, Ca, Mg, Ba, Fe, Sb Ti), like brucite, CaO, $CaCO_3$, $TiO_2$, $Sb_2O_3$, ZnO, $Fe_2O_3$, $BaSO_4$, $Mg(OH)_2$, $Al(OH)_3$, $Al_2O_3.3H_2O$.

All the fillers are preferably used in form of fine particles with average particle size (diameter) from 0.2 to 10 µm, more preferably from 0.5 to 5 µm, in particular from 0.5 to 4 µm.

The filled polyolefin compositions to be used for the films according to the present invention can be prepared by mixing the polymer component, the filler and optionally further additives according to methods known in the state of the art. For instance, the components may be mixed in an internal mixer having tangential rotors (such as Banbury mixers) or having interpenetrating rotors, or alternatively in continuous mixers (such as Buss mixers) or co-rotating or counter-rotating twin-screw mixers.

As previously said, the heat-sealable film according to the invention comprises at least one sealing layer. Thus it can be a mono-layer film, but preferably it is multilayer, and in particular it comprises at least one support layer composed of or comprising a polymeric material, in particular a polyolefin material.

The support layer or layers can be composed of or comprise one or more polymers or copolymers, or their mixtures, of R—CH=$CH_2$ olefins where R is a hydrogen atom or a C1-C6 alkyl radical, as for instance 1-butene, 1-hexene, 1-octene, 4-methyl-1-pentene.

Particularly preferred are the following polymers:
1) isotactic or mainly isotactic propylene homopolymers;
2) random copolymers of propylene with ethylene and/or C4-C8 α-olefins, such as for example 1-butene, 1-hexene, 1-octene, 4-methyl-1-pentene, wherein the total comonomer content ranges from 0.05% to 20% by weight, or mixtures of said copolymers with isotactic or mainly isotactic propylene homopolymers;

3) heterophasic copolymers comprising (a) a propylene homopolymer and/or one of the copolymers of item 2), and an elastomeric fraction (b) comprising copolymers of ethylene with propylene and/or a C4-C8 α-olefin, optionally containing minor amounts of a diene, such as butadiene, 1,4-hexadiene, 1,5-hexadiene, ethylidene-1-norbornene.

Preferably the amount of diene in (3) is from 1% to 10% by weight.

The heterophasic copolymers (3) are prepared according to known methods by mixing the components in the molten state, or by sequential copolymerization, and generally contain the copolymer fraction (b) in amounts ranging from 5% to 80% by weight. Other olefin polymers employable for the support layers are HDPE, LDPE and LLDPE polyethylenes.

Examples of polymeric materials different from polyolefins, employable for the support layers, are polystyrenes, polyvnylchlorides, polyamides, polyesters and polycarbonates.

Both the support layers and the heat-sealable layers may comprise additives commonly employed in the art, like stabilizers, pigments, fillers, nucleating agents, slip agents, lubricant and antistatic agents, flame retardants, plasticizers and biocidal agents.

Preferred structures for said films are of A/B type and A/B/A type, where A is the heat-sealable layer according to the present invention and B is the support layer.

Independently from the structure of the film, for the BOPP films the thickness of the layers of heat-sealing composition according to the present invention is preferably from 1 to 5 μm, more preferably from 1 to 3 μm, while the thickness of the support layers is preferably from 15 to 45 μm, more preferably from 15 to 25 μm.

The overall thickness of the said films is preferably of from 10 to 250 82 m, more preferably from 12 to 150 μm, most preferably from 15 to 80 82 m.

For films having greater thickness, as for instance cast films, the thickness of the layers of heat-sealing composition according to the present invention is preferably from 10 to 100 μm, more preferably from 25 to 50 μm, while the thickness of the support layers is preferably from 80 to 500 μm.

The said packaging films are produced by using processes well known in the art.

In particular, extrusion processes can be used.

In said extrusion processes the polymer materials to be used for the heat-sealing layers and those to be used for the support layers are molten in different extruders and extruded through a narrow slit.

The extruded molten material is pulled away from the slit and cooled before winding-up. Specific examples of extrusion processes are the blown film, cast film and BOPP processes hereinbelow explained.

Blown Film

The molten polymer materials are forced through a circular shaped slit.

The extrudate which is drawn off has the shape of a tube, which is inflated by air to form a tubular bubble. The bubble is cooled and collapsed before winding-up.

Cast Film

The molten polymer materials are forced through a long, thin, rectangular shaped slit. The extrudate has the shape of a thin film. The film is cooled before winding-up.

BOPP

The molten polymer materials are forced continuously through a narrow slit. The extruded molten material is pulled away from the slit and cooled, then heated again and stretched both in the Machine Direction (MD) and in the Transverse Direction (TD). After the stretching process, the film is cooled and then wound-up.

The following examples are given to illustrate, not to limit, the present invention.

The following analytical methods have been used to determine the properties reported in the present application.

| Property | Method |
|---|---|
| Comonomer content (% wt) | I.R. Spectroscopy |
| Melt Flow Rate (230 C., 2.16 kg) | ASTM D 1238, condition L |

Determination of Solubility in Xylene at Room Temperature (% by Weight):

2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. The weight percentage of polymer soluble in xylene at room temperature is then calculated. The percent by weight of polymer insoluble in xylene at room temperature is considered the isotactic index of the polymer. This value corresponds substantially to the isotactic index determined by extraction with boiling n-heptane, which by definition constitutes the isotactic index of polypropylene.

Seal Strength

Preparation of the Heat-sealable Films.

Films are prepared by extruding each test composition in a single screw Dr. Collin blown film extruder at a melt temperature of 210-250° C. The extruder is equipped with a smooth feed bore, and a standard LDPE screw of 30 mm diameter and a length to diameter ratio of 25 D, including the additional Maddock and Pineapple elements mounted on screw tip. The annular die diameter is 50 mm and the die gap is 1.2 mm. The films are cooled by mean of a dual flow cooling ring with cooling air at ambient temperature. The throughput is ca. 5 kg/h at a screw speed of 80 rpm. The bubble is layed-flat and winded at a film drawing speed of 7 m/min. Non-adhering films are produced with a bubble wall thickness of 50 μm, which is the final specimen thickness. In case of tacky films, the bubble wall thickness is 25μm and the final specimen thickness of 50 82 m is obtained by the lay-flat operation. Blocking in the film roll between the flat tubing layers is avoided by inserting an additional layer of paper or HDPE.

Determination of the Seal Strength.

For each test two of the above specimens with a thickness of 50 μm are superimposed in alignment, the adjacent layers being layers of the particular test composition. The superimposed specimens are sealed in transverse direction with a RDM Sealer, model HSE-3 multi seal. Sealing time is 1.2 seconds at a pressure of 6 bars. The sealing temperature is increased for each seal, starting from 30° C. The sealed samples are left to cool and stored 24 h under Standard conditions (23° C. and 50% relative humidity). The sealed samples are cut in 15 mm wide strips, which unsealed ends are attached to an Instron machine, where they are tested at a traction speed of 500 mm/min with an initial distance between the grips of 50 mm. The maximum force measured during the tensile test is defined as the seal strength.

Products Used in Working Examples

Component (A)

HPO-1: heterophasic polyolefin composition comprising 17% wt. of (A$^I$) a crystalline copolymer of propylene with 3.3% wt. ethylene, and 83% wt. of (A$^{II}$) an elastomeric fraction of propylene with ethylene, as prepared in Example 3 of WO03/011962, having a Melt Flow Rate value of about 0.5 g/10 min. and a content of fraction soluble in xylene at room temperature of about 80% by weight. Other properties for the HPO-1 composition are:

xylene solubility (room temperature) of the said propylene copolymer (A$^{I}$)=7.5% wt;
composition of the said elastomeric fraction (A$^{II}$):
  63.5% wt of a propylene/ethylene fraction containing about 28% wt of ethylene and about 90% wt of fraction soluble in xylene at room temperature, and
  36.5% wt of propylene/ethylene fraction containing about 38% wt of ethylene and about 90% wt of fraction soluble in xylene at room temperature.

HPO-2: heterophasic polyolefin composition comprising 33% wt. of a crystalline copolymer of propylene with 4.3% wt. ethylene, and 67% wt. of an elastomeric fraction of propylene with ethylene.

Component (B)

Talc: HM05 talc in form of fine powder with average particle size of about 2 μm.

EXAMPLE 1 and 2 and COMPARATIVE EXAMPLES 1 to 4

Filled polyolefin compositions are obtained by blending in a BUSS 70 co-kneader the heterophasic polyolefin composition and the mineral filler reported in Table 1.

It is operated with a rate of 60 kg/h, a maximum (melt) temperature of 232° C. and a mixing screw rotation speed of 270 rpm.

TABLE 1

| Example No. | Comp. 1 | 1 | Comp. 2 | Comp. 3 | Comp. 4 |
|---|---|---|---|---|---|
| Component (A) wt % | HPO-1 100% | HPO-1 50% | HPO-2 100% | HPO-2 75% | HPO-2 50% |
| Component (B) wt % | none | Talc 50% | none | Talc 25% | Talc 50% |

The above reported filled and not filled polyolefin compositions are used to prepare films with the apparatus and under the conditions above described in the section relating to the measurement of seal strength.

The sealing temperatures used and the seal strength values consequently achieved are reported in Table 2 below.

TABLE 2

| Seal Temperature | Example No. | | | | |
|---|---|---|---|---|---|
| | Comp. 1 | 1 | Comp. 2 | Comp. 3 | Comp. 4 |
| | Seal Strength (N/mm) | | | | |
| 30° C. | 0.098 ± 0.008 | 0 | 0 | 0 | no film |
| 50° C. | 0.113 ± 0.003 | 0.012 ± 0.006 | 0.007 ± 0.000 | 0.007 ± 0.000 | no film |
| 70° C. | 0.185 ± 0.015 | 0.090 ± 0.023 | 0.019 ± 0.005 | 0.019 ± 0.012 | no film |
| 90° C. | 0.300 ± 0.046 | 0.407 ± 0.085 | 0.240 ± 0.086 | 0.241 ± 0.061 | no film |
| 100° C. | 0.301 ± 0.038 | 0.593 ± 0.058 | 0.370 ± 0.021 | 0.386 ± 0.027 | no film |
| 110° C. | 0.313 ± 0.026 | 0.688 ± 0.040 | 0.484 ± 0.027 | 0.479 ± 0.045 | no film |
| 120° C. | 0.307 ± 0.029 | 0.640 ± 0.024 | 0.656 ± 0.018 | 0.535 ± 0.084 | no film |
| 130° C. | 0.342 ± 0.039 | 0.586 ± 0.015 | 0.823 ± 0.028 | 0.610 ± 0.056 | no film |
| 140° C. | 0.290 ± 0.027 | / | / | / | no film |
| 150° C. | 0.263 ± 0.027 | 0.521 ± 0.042 | 0.968 ± 0.050 | 0.669 ± 0.065 | no film |
| 170° C. | / | 0.570 ± 0.014 | 1.047 ± 0.095 | 0.685 ± 0.060 | no film |

Comparative example 4 shows that by using HPO-2 with 50% of talc it is not possible to produce a good quality film. During processing, the bubble is perforated with micro-holes and the film lacks physical integrity.

The invention claimed is:

1. A polyolefin film comprising at least one layer of a polyolefin composition (I) comprising (percent by weight):
   A) 20% to 80% of a heterophasic polyolefin composition comprising:
      A$^{I}$) 3% to 30% by weight of a crystalline polymer fraction selected from: (i) a propylene homopolymer, having solubility in xylene at room temperature lower than 10% by weight, (ii) a copolymer of propylene and at least one α-olefin of formula H$_2$C=CHR, where R is H or a C$_2$-C$_{10}$ linear or branched alkyl, containing at least 85% by weight of propylene, having solubility in xylene at room temperature lower than 15% by weight or (iii) a mixture of (i) and (ii); and
      A$^{II}$) 70% to 97% by weight of an elastomeric fraction comprising at least an elastomeric copolymer of propylene with 12 to 88% by weight of ethylene, and having solubility in xylene at room temperature greater than 50% by weight; and
   B) 20% to 80% of at least one filler,
   wherein the film is a heat-sealable, blown film having an overall thickness of 12 to 150 micrometers, and
   wherein the polyolefin composition (I) has a melt flow rate from 0.1 to 10 g/10 min.

2. The film according to claim 1, wherein component (B) is an inorganic filler.

3. The film according to claim 1, wherein component (B) is a filler selected from talc, kaolin, clay, anhydrous or hydrated oxides and salts of metals.

4. The film according to claim 1, wherein component (B) is CaCO$_3$.

5. The film according to claim 1, having a structure of: A/B or A/B/A, where A is a heat-sealable layer comprising the polyolefin composition (I) and B is a support layer.

6. A process for packaging comprising applying a heat-sealable polyolefin blown film having an overall thickness of 12 to 150 micrometers to an article, the heat-sealable polyolefin film comprising at least one layer of a polyolefin composition (I) comprising (percent by weight):
   A) 20% to 80% of a heterophasic polyolefin composition comprising:
      A$^{I}$) 3% to 30% by weight of a crystalline polymer fraction selected from: (i) a propylene homopolymer, having solubility in xylene at room temperature lower than 10% by weight, (ii) a copolymer of propylene and at least one α-olefin of formula $H_2C=CHR$, where R is H or $C_2$-$C_{10}$ linear or branched alkyl, containing at least 85% by weight of propylene, having solubility in xylene at room temperature lower than 15% by weight or (iii) a mixture of (i) and (ii); and $A^{II}$) 70% to 97% by weight of an elastomeric fraction comprising at least an elastomeric copolymer of propylene with 12 to 88% by weight of ethylene, and having solubility in xylene at room temperature greater than 50% by weight; and B) 20% to 80% of at least one filler wherein the polyolefin composition (I) has a melt flow rate from 0.1 to 10 g/10 min.

7. The film of claim 1, wherein the overall thickness is 15 to 80 micrometers.

* * * * *

UNITED STATES PATENT AND TRADEMARK OFFICE
CERTIFICATE OF CORRECTION

PATENT NO. : 8,722,790 B2
APPLICATION NO. : 11/793660
DATED : May 13, 2014
INVENTOR(S) : Nicolas Kokel et al.

Page 1 of 1

It is certified that error appears in the above-identified patent and that said Letters Patent is hereby corrected as shown below:

Title page
Abstract (57) Column 2, Line number 12, delete "C2-C10" and insert --$C_2$-$C_{10}$--;
Specification
Column 2, Line number 13, delete "C2-C10" and insert --$C_2$-$C_{10}$--;
Column 2, Line number 23, delete "C2-C10" and insert --$C_2$-$C_{10}$--;
Column 2, Line number 63, delete "C2-C10" and insert --$C_2$-$C_{10}$--;
Column 3, Line number 5, delete "C2-C10" and insert --$C_2$-$C_{10}$--;
Column 4, Line number 38, delete "$Al_2O_3.3H_2O$." and insert --$Al_2O_3.3H_2O$.--;
Column 4, Line number 59, delete "C1-C6" and insert --$C_1$-$C_6$--;
Column 4, Line number 65, delete "C4-C8" and insert --$C_4$-$C_8$--;
Column 5, Line number 6, delete "C4-C8" and insert --$C_4$-$C_8$--;
Column 5, Line number 19, delete "polyvnylchlorides," and insert --polyvinylchlorides,--;
Column 5, Line number 36, delete "82 m," and insert --µm,--;
Column 5, Line number 37, delete "82 m." and insert --µm.--;
Column 6, Line 46, delete "82 m" and insert --µm--;
Claims
Column 9, Claim number 6, Line number 12, after "filler", insert --,--.

Signed and Sealed this
Sixteenth Day of February, 2016

Michelle K. Lee
*Director of the United States Patent and Trademark Office*